E. A. BARTEZKI.
SIGNALING DEVICE.
APPLICATION FILED JULY 10, 1916.

1,233,833.

Patented July 17, 1917.
2 SHEETS—SHEET 1.

Inventor:
Emil A. Bartezki,
By Hugh K. Wagner,
His Attorney.

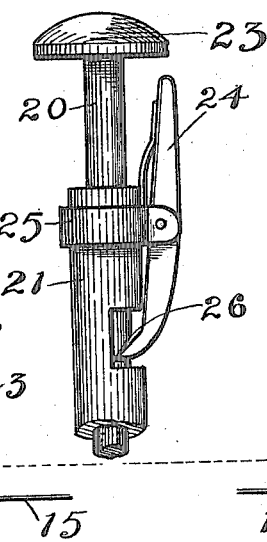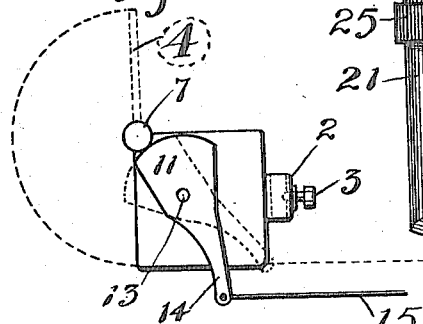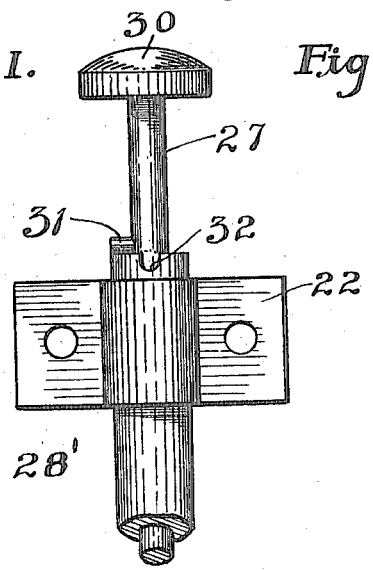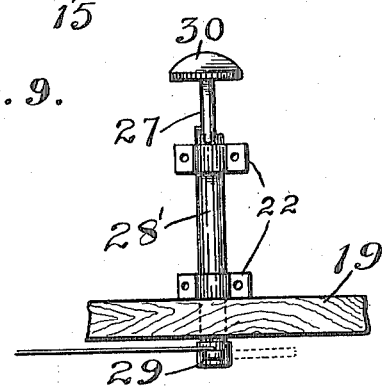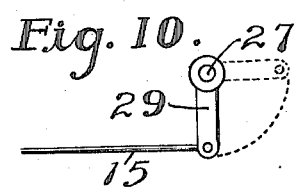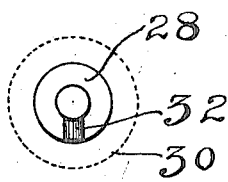

UNITED STATES PATENT OFFICE.

EMIL A. BARTEZKI, OF ST. LOUIS, MISSOURI.

SIGNALING DEVICE.

1,233,833.   Specification of Letters Patent.   Patented July 17, 1917.

Application filed July 10, 1916. Serial No. 108,385.

*To all whom it may concern:*

Be it known that I, EMIL A. BARTEZKI, a citizen of the United States, residing at the city of St. Louis, in the State of Missouri, have invented certain new and useful Improvements in Signaling Devices, of which the following is a specification.

This invention relates to vehicle signal devices and has for its object to provide a simple device of the character described of cheap construction.

Another object is to provide a signaling device adapted as a vehicle tail-light in one position of parts and adapted to display a stop warning or the like in another position of parts.

Another object is to provide the device with simple mechanism adapted for conveniently operating the signal from the driver's seat of the vehicle.

Furthermore this invention consists in the construction, arrangement, and combination of parts hereinafter described and set forth in the claims.

In the accompanying drawings forming part of this specification, wherein like numbers of reference denote like parts wherever they occur, Figure 1 is a view in elevation of the signal box showing same in normal position of parts adapted as a vehicle tail-light;

Fig. 6 is a view in vertical elevation of the mechanism adjacent the driver's seat adapted for operating the geared mechanism for opening and closing the signal box cover, a fragment of the connecting means between said operating mechanism and said geared mechanism being shown attached to said operating mechanism;

Fig. 7 is a view on an enlarged scale showing details of construction of a portion of Fig. 6;

Fig. 8 is an end view of the signal box and the geared mechanism with a fragment of the connecting means between said geared mechanism and the mechanism of Fig. 6 shown attached to said geared mechanism;

Fig. 9 is a view in vertical elevation showing a modified form of construction of the parts shown in Fig. 6;

Fig. 10 is a plan view looking upwardly at Fig. 9;

Fig. 11 is a view on an enlarged scale showing details of construction of a portion of Fig. 9; and Fig. 12 is a plan view looking down upon Fig. 11, the outline of the bar-head being shown in dotted lines and the bar and the supporting bracket being removed.

Figure 1:
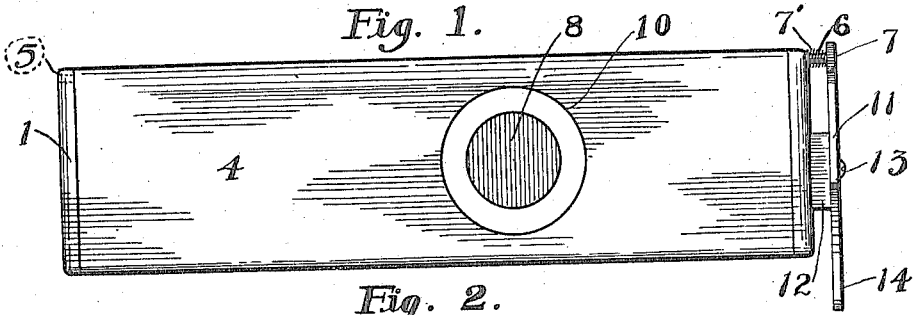

Signal-box 1 may be adapted to be mounted in any suitable position, such, for instance, as at the rear of a vehicle or the like (not shown) by means of sleeve 2 or the like borne by said signal-box, said sleeve being adapted to receive therethrough a standard or the like (not shown) borne by any suitable part of the vehicle (not shown), set-screw 3 being adapted for engaging said standard in a well known manner to hold said signal-box firmly in mounted position.

One side of signal-box 1 may be open, said opening being adapted to face rearwardly of the vehicle (not shown) in the case of a signal-box mounted at the rear of said vehicle. Cover 4 for said opening may be hingedly attached to said signal-box in any suitable manner, such, for instance, as by means of rod 5 borne by the upper edge of said cover, the opposite ends of said bar being rotatably mounted in opposite sides of said signal-box, one of said ends bearing an extension 6 adapted to protrude outwardly of the adjacent side of signal-box 1, pinion 7 being rigidly mounted on said extension, there being a coiled spring 7′ or the like mounted on said extension between the adjacent side of said signal-box and said pinion, said cover being adapted to be moved from open to closed position under tension of said spring, for which purpose one end of said spring may be secured to said rod extension or to said pinion and the other end may be secured to the adjacent side of said signal-box.

Plate 8 may be transparent and may be of glass or any other suitable material, said plate being mounted within the signal box adjacent the open side thereof. The body of plate 8 may be of any suitable color, such, for instance, as red, and may bear a sign, such, for instance, as the word "Stop," the letters of said sign being on clear glass or of any suitable color adapted to contrast with the background or the color of the body of said plate. Lamp 9 or the like may be mounted behind plate 8 to illuminate the sign at night so that it may be clearly seen when said sign is exposed to view as said cover is opened and, also, to provide a vehicle tail-light or the like when said cover is closed, an opening 10 borne by cover 4 being adapted as an appropriately illuminated port hole when said cover is closed.

Opening 10 may be adapted substantially to register with the letter "o" of the sign "Stop" or the like borne by plate 8 or said opening may be in any other suitable position relative to said sign and plate, the purpose of said opening being to provide an appropriately illuminated port adapted as a tail light when cover 4 is closed to conceal said sign.

Segmental gear 11 adapted to mesh with pinion 7 may be mounted on lug 12 borne by an adjacent side of signal-box 1, said gear being pivotally mounted on said lug by means of pin 13 or the like. Lever 14, borne by segmental gear 11, is adapted for rocking gear 11 on its pivotal bearing 13 for the purpose and in the manner hereinafter described, one end of pull-cord or chain 15 or the like being secured to the perforated end of said lever (as best seen in Fig. 8.) The other end of said pull-cord or chain may be secured to an arm of bell-crank lever 16, said bell-crank lever being mounted at 17 adjacent to bracket 18 in a position adapted to permit said lever to be rocked in a substantially vertical plane beneath the floor 19 of the vehicle, and the other arm of said bell-crank lever may be attached to the lower end of stem 20, said lower end being adapted to extend downwardly through floor 19. Stem 20 may be mounted slidable vertically in sleeve 21, said sleeve being secured to adjacent portions of the vehicle by means of brackets 22 or the like, the upper end of said stem being adapted to be within convenient reach from the driver's seat (not shown) and may be provided with head 23.

Figure 2:
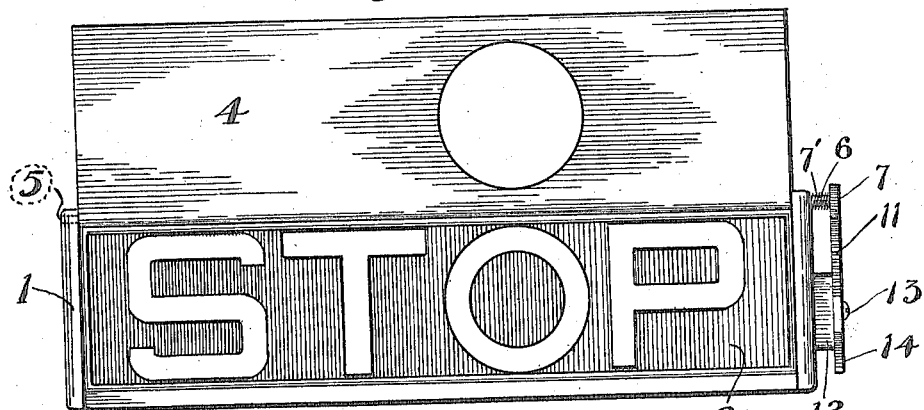
Fig. 2 is a view in elevation showing the hinged lid of the signal box in open position and disclosing the stop warning sign therein.
Figure 3:
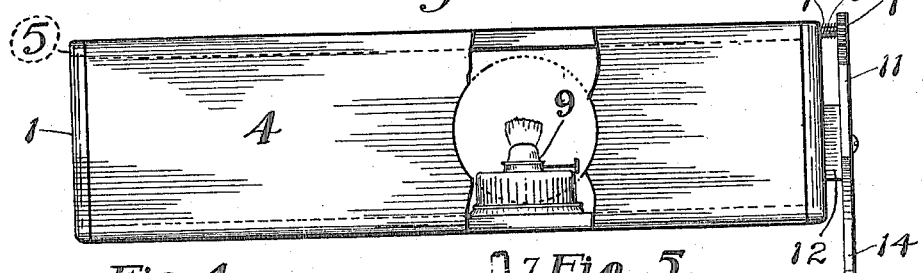
Fig. 3 is a view of Fig. 1 with the stop warning sign removed, parts of the hinged lid of the signal box being broken away to show the position of the tail-lamp in the signal box.
Figure 4:
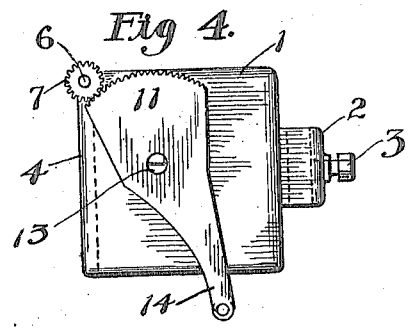
Fig. 4 is an end view of the signal box showing the position of the geared mechanism when the hinged cover is in the closed position shown in Fig. 1.
Figure 5:
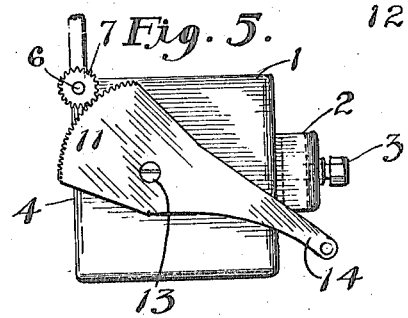
Fig. 5 is an end view of the signal box showing the position of the geared mechanism when the hinged cover is in the open position shown in Fig. 2.

Normally cover 4 is in closed position and the parts are in the position shown in full lines in Figs. 6 and 8. In this position of parts the "Stop" sign or the like (exposed in Fig. 2) is concealed from view, opening 10 providing a port through which an adjacent portion of plate 8 will show and will provide a vehicle tail-light at night when lamp 9 is lighted. When stem 20 is depressed, bell-crank lever 16 will be rocked on its pivotal bearing 17 substantially to the dotted line position shown in Fig. 6, thereby pulling pull-cord 15 and causing segmental gear 11 to rock on its bearing 13 substantially to the dotted line position shown in Fig. 8, thus causing pinion 7 and bar 6 to rock to open cover 4 and expose the "Stop" sign or the like to view rearwardly of the vehicle.

Cover 4 is thus moved to open position against the tension of spring 7', which, aided also by the weight of said cover, tends to restore the parts to initial position. For the purpose of holding the parts in adjusted position adapted to hold cover 4 open, a spring-latch 24 or the like may be appropriately mounted on collar 25 or the like borne by sleeve 21, the nose of said latch under spring tension being adapted to engage in an appropriately-shaped notch 26 borne by stem 20, there being a cut-out portion in sleeve 21 adapted to permit said nose to engage said notch when said stem has been depressed to the position adapted to move cover 4 from closed to open position. To cause said cover to move from open to closed position, spring-latch 24 is released from engagement with notch 26, whereupon the tension of spring 7' will cause the parts to be restored to initial position.

A modified construction of portions of this device is depicted in Figs. 9, 10, and 11. In this modified form, a rotatable stem 27 is substituted for slidable stem 20, said rotatable stem being rotatably mounted in bearing-sleeve 28' or the like, brackets 22 being adapted for securing said bearing-sleeve to adjacent portions of the vehicle (not shown). The lower end of said rotatable stem is adapted to extend downwardly through floor 19 of the vehicle, said end being rigidly secured to one end of lever 29, an adjacent end of pull-cord or chain 15 being secured to the other end of said lever, said lever being adapted to swing in a substantially horizontal plane when rotatable stem 27 is rocked in its bearing-sleeve 28'. The upper end of rotatable stem 27 may be provided with a knurled knob 30 or the like, said knob being adapted to be within convenient reach from the driver's seat (not shown).

When knob 30 is manipulated to rock stem 27 to swing lever 29 from initial position shown in full lines in Figs. 9 and 10 to the position shown in dotted lines in said figures, pull-cord 15 will cause segmental gear 11 and its associated parts to operate to open cover 4 against the tension of spring 7', and pin 31 rigidly borne by stem 27 will drop into engagement with notch 32 borne in the upper end of bearing-sleeve 28' and thus lock the parts in positions adapted to hold cover 4 open against the tension of spring 7', it being, of course, understood that stem 27 is also vertically slidable in said bearing-sleeve, said pin 31 engaging the upper end of bearing-sleeve 28', being adapted to limit the downward movement of said stem.

To cause said cover to move from open to closed position in the modified form of the device just described, stem 27 is raised to lift pin 31 out of notch 32 and the tension of spring 7' will operate to restore the parts to initial position with cover 4 closed.

Various changes in the construction, arrangement, and combination of parts may be made without departing from the nature and spirit of the present invention.

I claim:

1. In a signal device, a casing having an open side, illuminating means for the casing, a transparent sign plate secured in the open side of the casing, opaque letters on said sign plate, and a hinged cover for the open side of the casing and having a sight opening therein conforming to the contour of one of the letters, whereby, when the cover is closed, the light of the illuminating means will shine through the transparent portion of the letter and the sight opening to form a "tail" light, and, when the cover is raised, a stop signal will be displayed.

2. In a signal device, a casing having an open side, illuminating means for the casing, a transparent sign plate secured in the open side of the casing, opaque letters on said sign plate, a hinged cover for the open side of the casing and having a sight opening therein conforming to the contour of one of the letters, whereby, when the cover is closed, the light of the illuminating means will shine through the transparent portion of the letter and the sight opening to form a "tail" light, and, when the cover is raised, a stop signal will be displayed, and means, controlled from the driver's seat of a vehicle, for opening and closing said cover.

In testimony whereof I hereunto affix my signature.

EMIL A. BARTEZKI.

Copies of this patent may be obtained for five cents each, by addressing the "Commissioner of Patents, Washington, D. C."